Patented Oct. 13, 1942

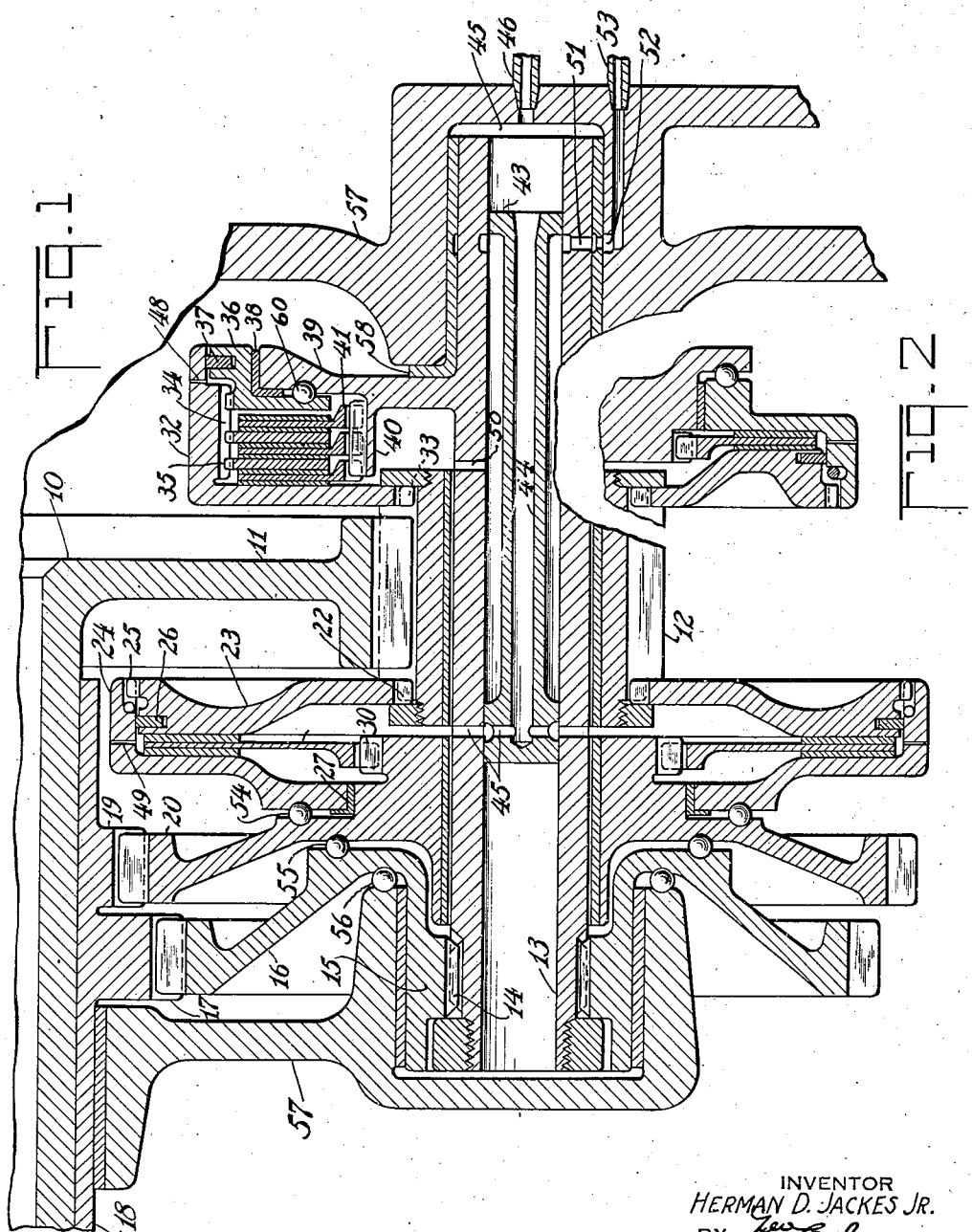

2,298,645

UNITED STATES PATENT OFFICE 2,298,645

TRANSMISSION

Herman D. Jackes, Jr., Bloomfield, N. J., assignor to Wright Aeronautical Corporation, a corporation of New York Application December 23, 1940, Serial No. 371,349

2 Claims. (Cl. 74—364)

This invention relates to transmissions and is particularly concerned with a clutching system by which the drive ratio in a gear train may be altered while the gear train is under load.

A particular application for the teachings of my invention is in connection with two-speed supercharger drives as used on aircraft engines. A supercharger impeller is gear driven from the engine crankshaft, and means may be provided to change the ratio of drive from the crankshaft to the impeller. Since the shifting of gear ratio must be done under load, friction clutches are used to engage the gears for different ratios. These clutches are operated by hydraulic pressure cells which rotate with the gears. In such a rotating clutch cell, centrifugal pressure is built up so that even when the fluid pressure supply is cut off from the cell, the clutch may still be held in engagement unless the centrifugal fluid pressure is relieved by suitable leak openings at the periphery of the clutch cell. In internal combustion engines, the lubricating oil which is used to fill the clutch operating cells may accumulate foreign matter and in some cases the leak openings have been clogged by the deposition of foreign matter from the oil on the periphery of the clutch cell, due to centrifuging action.

It is an object of this invention to provide a rotating hydraulic cell and clutch combination which shall be free from the possibility of clogging by foreign matter. It is a further object of the invention to provide a dual clutch and hydraulic pressure cell system wherein friction clutches are contained within the hydraulic cells but wherein the friction clutch of one cell is engaged by the admission of pressure fluid to the other cell—that cell in which the engaged clutch is located is clear of hydraulic fluid.

A further object of the invention is to provide a clutch system for a two-speed gearset in which inversely operating friction clutches are used and in which engagement of one clutch positively enforces disengagement of the other clutch.

Further objects of the invention will become apparent in reading the annexed detailed description in connection with the drawing, in which:

Fig. 1 is a longitudinal section through a two-speed supercharger drive incorporating the provisions of this invention and shown on one side of the center of a main driving shaft; and Fig. 2 is a fragmentary longitudinal section showing an alternate type of clutch for one of the two clutches of the gearset.

In Fig. 1, the rear end of the main power shaft is shown at 10, this being provided with a drive gear 11 meshed with a pinion 12 floatingly borne on a layshaft 13. The left end of the layshaft has splined thereto as at 14 the hub 15 of a gear 16 meshed with a pinion 17 on a supercharger impeller shaft 18 sleeved over the shaft 10 and rotatable relative thereto. Said shaft 18 also carries a pinion 19 meshed with the gear 20 floatingly journaled on the layshaft 13.

At the left end of the pinion 12 is secured, as at 22, a combined piston and clutch plate 23 engaged for axial movement in a cylinder 24 through splines 25 and sealed relative to the cylinder by a piston ring 26. The cylinder 24 obviously rotates with the piston 23 and is journaled on a bushing 27 upon the hub of the gear 20. The facing portions of the cylinder 24 and of the piston 23 embrace a clutch plate 29 splined at 30 to the hub of the gear 20 so that, when the pinion 12 is shifted axially to the left, the elements 23 and 24 are frictionally engaged with the clutch plate 29 to afford direct drive from the pinion 12 to the gear 20.

To the righthand end of the pinion 12 is secured a cylinder 32, as at 33, said cylinder including splines 34 carrying clutch plates 35 and a piston 36, the cylinder 32 and the piston 36 being relatively axially movable and being sealed to one another during axial movement by a piston ring 37. The piston 36 is borne on a bushing 38 supported by a flange 39 of the layshaft 13. Said flange also carries a splined element 40 upon which clutch plates 41 are mounted for rotation therewith and for axial movement relative thereto. Thus, when the pinion 12 is moved to the right, the clutch plates 35 and 41 are engaged with one another to afford direct drive from the pinion 12 through the cylinder 32 to the layshaft 13 and to the gear 16.

It will be apparent from the above that alternate drive ratios are available according to whether the clutch 23, 24, 29, or the clutch 35, 41 is engaged. Since alternate engagement of the clutches depends upon axial shift of the pinion 12, it will be apparent that one of the clutches must be disengaged while the other clutch is engaged and vice versa.

The layshaft 13 is hollow and is provided with a sleeve 43 having an axial drilling 44 communicating at its righthand end with a cavity 45 to which pressure fluid may be selectively fed through a conduit 46. The drilling 44 communicates through passages 45 formed in the elements 43 and 13, with the cavity between the piston 23 and cylinder 24. When pressure fluid is admitted to the conduit 46, the piston 23 is moved to the right with respect to the cylinder 24, positively disengaging the clutch 23, 24, 29 and positively enforcing rightward movement of the pinion 12 and engagement of the clutch 35, 41. At this time, no fluid pressure will be passed to the pressure cell formed by the cylinder 32 and the piston 36, and that fluid which may remain in said cell will be evacuated therefrom through one or more peripheral bleed openings 48 in the cylinder 32. It will be apparent that as the cell 23, 24 is subjected to pressure fluid, the drive ratio will pass from the gear 11 through the pinion 12 to the layshaft 13 and thence to the gear 16 and the pinion 17 and under such circumstances, there will be relative rotation between the clutch plate 29 and elements 23 and 24. This relative rotation will tend to stir violently the pressure lubricant within the cell to prevent the deposition of sludge or foreign matter on the interior of the wall of the cylinder 24. Small peripheral bleed openings 49 are provided in the cylinder 24 for leakage of pressure fluid therefrom, these openings being small enough so that they cannot scavenge the pressure cell while it is open to the fluid pressure supply.

Pressure fluid may be admitted to the pressure cell formed by the elements 32, 36, and 39, through a passage 50 in the layshaft communicating with the passage 51 and with a transfer bearing 52 leading to a pressure supply conduit 53. When it is desired to utilize the other gear ratio available in the transmission, pressure fluid will be cut off from the conduit 46 and will be admitted to the conduit 53 whereupon the cell 23, 24 is scavenged by centrifugal bleed through the orifices 49 and whereupon pressure fluid admitted to the cylinder 32 will cause leftward shift of the pinion 12 and consequent engagement of the clutch formed by the elements 23, 24, 29. The leftward movement of the pinion 12 positively disengages the clutch plates 35 and 41 and these plates will rotate relative to one another as the drive passes directly from the pinion 12 through the clutch 23, 24, 29 to the gear 26. Thus, in the cell which includes the cylinder 32 the pressure fluid therein will be violently agitated by the relative rotation of the clutch plates to the end that deposition of foreign matter is prevented and there will be continual small fluid bleed through the peripheral orifices 48.

When the lefthand pressure cell is actuated by pressure fluid, the hydraulic reaction is carried from the cylinder 24 through thrust bearings 54, 55 and 56 to the fixed housing 57 in which the layshaft is carried. Opposite reaction is taken through the flange 39 through a bushing flange 58 to the righthand portion of the housing 57.

When the righthand clutch cell is filled with pressure fluid, the rightward hydraulic reaction is taken through a ball thrust bearing 66 to the flange 39 and to the housing 57 through the thrust bushing 58. Leftward force upon the cylinder 32 engages the lefthand clutch, and the thrust bearings 54, 55 and 56 transfer the leftward force from the hydraulic cell to the lefthand portion of the fixed housing 57.

Fig. 2 merely shows a single plate clutch as an alternate for the multi plate clutch 35, 41. The clutch of Fig. 2 is substantially similar to the lefthand clutch of Fig. 1, turned end for end.

It will be apparent that two advantages flow from the invention—one, that the friction clutches are coincidentally inversely operable; that is, when one is engaged the other is forcibly disengaged and the clutches may be operated without slackening the torsional driving force from the crankshaft 10. The other advantage is that the clutches and their operating fluid pressure cells are so coordinated that the loading pressure cell forms a portion of the disengaged clutch whereby the pressure fluid therein is continually stirred and agitated. Conversely, the fluid pressure cell forming a part of the engaged clutch is substantially free of lubricant and may not accumulate sludge or foreign matter regardless of how long it may be held in engagement. The construction of this invention would tend to overcome some of the faults of prior apparatus which functioned perfectly so long as shifts between high and low ratio were made at fairly frequent intervals but which had a tendency to lock up or freeze in one ratio if shifts from one ratio to another were not made at frequent intervals, this freezing up being due in large part to the accumulation of sludge and foreign matter in the pressure cells which interfered with their proper functioning.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission assembly, a drive shaft having a relatively large gear, a sleeve embracing the drive shaft having side-by-side different sized pinions, both on one side of the drive gear, a layshaft having a pinion rotatable thereon and meshed with the drive gear, said layshaft having a gear meshed with one driven pinion, a sleeve rotatable on the layshaft having a gear engaged with the other driven pinion, a first friction clutch between the layshaft pinion and said layshaft and sleeve gears, of larger diameter than the layshaft pinion, engageable to couple the layshaft pinion to the sleeve gear, and a second friction clutch on the opposite side of the layshaft pinion and larger in diameter than the layshaft pinion, engageable to couple the layshaft pinion to the layshaft and its gear.

2. In a transmission assembly, a drive shaft having a relatively large gear, a sleeve embracing the drive shaft having side-by-side different sized pinions, both on one side of the drive gear, a layshaft having a pinion rotatable thereon and meshed with the drive gear, said layshaft having a gear meshed with one driven pinion, a sleeve rotatable on the layshaft having a gear engaged with the other driven pinion, a first friction clutch between the layshaft pinion and said layshaft and sleeve gears, of larger diameter than the layshaft pinion, engageable to couple the layshaft pinion to the sleeve gear, a second friction clutch on the opposite side of the layshaft pinion and larger in diameter than the layshaft pinion, engageable to couple the layshaft pinion to the layshaft and its gear, said clutches each including an element rigid with the ends of the layshaft pinion, said elements and pinion being bodily axially shiftable to enforce disengagement of one clutch when the other is engaged, and hydraulic means embodied in said clutches to enforce said axial shift.

HERMAN D. JACKES, Jr.